US 6,612,802 B2

(12) United States Patent
Egan (10) Patent No.: US 6,612,802 B2
(45) Date of Patent: Sep. 2, 2003

(54) ELECTRICALLY-ACTUATED TRANSFER SEAT

(76) Inventor: Thomas F. Egan, 570 Hance Rd., Binghamton, NY (US) 13903

( * ) Notice: Subject to any disclaimer, the term of this patent is extended or adjusted under 35 U.S.C. 154(b) by 0 days.

(21) Appl. No.: 09/921,300

(22) Filed: Aug. 3, 2001

(65) Prior Publication Data

US 2002/0071752 A1 Jun. 13, 2002

Related U.S. Application Data

(60) Provisional application No. 60/222,942, filed on Aug. 4, 2000.

(51) Int. Cl.$^7$ .............................. A61G 3/00; A61G 3/04
(52) U.S. Cl. ....................................... 414/539; 414/921
(58) Field of Search .................................. 414/539, 921

(56) References Cited

U.S. PATENT DOCUMENTS

| | | | | |
|---|---|---|---|---|
| 2,792,951 A | * | 5/1957 | White ..................... | 414/921 X |
| 4,015,725 A | * | 4/1977 | Ryan et al. .............. | 414/921 X |
| 4,140,230 A | * | 2/1979 | Pearson ................... | 414/921 X |
| 4,664,584 A | * | 5/1987 | Braun et al. ............ | 414/921 X |

FOREIGN PATENT DOCUMENTS

DE          3123546      *  1/1983   .................. 414/921

* cited by examiner

*Primary Examiner*—Steven A. Bratlie
(74) *Attorney, Agent, or Firm*—Thomas E. Anderson (57) ABSTRACT

An electrically-actuated lifting and transferring apparatus designed to facilitate the lifting and transfer process of a disabled person into and out of a vehicle. In a preferred embodiment, an apparatus in accordance with the present invention is realized as having a vertical or semi-vertical electric or hydraulic extension arm, a mounting apparatus, a seat belt interlock system or foldaway safety arm, a support member along a plane having a horizontal component with option to pivot from its end point from a horizontal to a substantially vertical axis, and a seat surface with locking device pivoting about a substantially horizontal axis.

14 Claims, 8 Drawing Sheets

ELECTRICALLY-ACTUATED TRANSFER SEAT

CROSS-REFERENCE TO RELATED APPLICATIONS

This patent application claims priority to U.S. Provisional Patent Application No. 60/222,942, filed Aug. 4, 2000, which is hereby incorporated by reference herein in its entirety.

FIELD OF THE INVENTION

The present invention relates generally to devices and methods for lifting and transferring persons into and out of vehicles and, more particularly, to an electrically-actuated transfer seat for assisting persons when entering and exiting a vehicle.

BACKGROUND OF THE INVENTION

Difficulties are often encountered when a disabled person transfers from one location to another whether independently or assisted. Particularly in the case of wheelchair-bound persons or persons with severe mobility impairments, it is often quite difficult to lift and transfer persons to and from their wheelchair when entering or exiting a motor vehicle. Additionally, persons who are semi-ambulatory may have difficulties entering or exiting vehicles which are substantially higher or lower than the level required for comfortable entry or egress.

There have been some inventive efforts directed at alleviating the problems associated with transferring disabled persons from one location to another. For example, U.S. Pat. Nos. 4,365,924 and 5,459,891 are both directed toward devices for transferring disabled persons.

The aforementioned disclose devices which allow a disabled person to be lifted from a wheelchair into a vehicle. However, the devices disclosed in these patents, as well as other known devices, have drawbacks in the areas of cost and complexity which could limit the potential mobility of a disabled individual.

For instance, a product called Easy Rizer™, which is presently on the market, requires extensive modifications to the chassis of a vehicle, thus incurring substantial costs and delays in installation times, substantial modifications to the original appearance and esthetics of the vehicle, as well as important safety concerns as to potential compromises of the structural integrity and occupant crash protection. Additionally, this type of product, due to inherent limitations of its size and design, is applicable only to a limited range of body styles in the van and truck vehicle category.

In view of the foregoing, it would be desirable to provide a lifting and transferring apparatus for assisting persons when entering and exiting a vehicle which overcomes the above-described inadequacies and shortcomings, while providing a universally-applicable, low-cost, safe, easy-to-install solution for its user.

SUMMARY OF THE INVENTION

According to the present invention, a seat lifting and transferring apparatus and method is provided for assisting persons when entering and exiting a vehicle. The present invention seat lifting and transferring apparatus has a mounting bracket wherein the mounting bracket has a first support means for attachment to the chassis of the vehicle, a second support means for attachment of the first support means to a vertical extension arm, an electric or hydraulic extension arm for moving a horizontal support and seat along a substantially vertical axis, a horizontal support member which can alternatively pivot about a substantially horizontal axis located at the base of the extension arm, a cam-locking device to secure the horizontal support member once it has reached a substantially vertical orientation, a seat surface which rotates about a substantially horizontal axis when the horizontal support member is placed in a horizontal position, and a biaxial foldaway safety arm pivoting about a substantially vertical, then a substantially horizontal axis.

The present invention may be realized in two or more versions, including a single-fold version and a bi-fold version. The bi-fold version incorporates the aforementioned capability of pivoting about a substantially horizontal axis at the base of the extension arm to a locking position once it has reached a substantially vertical orientation for purposes of easy storage and greater lifting range.

In accordance with further aspects of the present invention, the electric or hydraulic extension arm can move the horizontal support member and seat between a first position and a second position along a plane having a vertical component.

In accordance with still further aspects of the present invention, the alternatively pivoting horizontal support member can incorporate a cam-style locking mechanism with a spring-loaded locking pin to facilitate secure storage of the horizontal support member and seat assembly when in a substantially vertical stored position. This feature alleviates concerns of potential impact and injury associated with frontal collisions.

In accordance with still further aspects of the present invention, the seat assembly can alternatively incorporate a lever-operated locking mechanism for purposes of securing the seat in a substantially vertical plane when the horizontal support member and seat assembly are in the upright and locked position. This feature alleviates concerns of potential impact and injury associated with unintended rotation of the seat assembly due to normal vehicle motion or impact.

In accordance with still further aspects of the present invention, the seat assembly can alternatively incorporate a biaxial folding safety arm pivoting about a substantially vertical axis at its attachment point to the seat, then about a substantially horizontal axis at its central articulation point to form an effective barrier, stabilization, and transfer aid for the user during the entry and egress process.

In accordance with still further aspects of the present invention, the seat lifting and transferring apparatus may alternatively incorporate a first means of support designed to attach to the electric or hydraulic extension arm to the chassis of the vehicle via a support structure having a horizontal support member aligned with the axis of the electric or hydraulic extension arm, and vertical support members aligned with the plane of the vehicle floor board for purposes of affixing the support structure to pre-existing vehicle seat and belt system fasteners. This feature alleviates concerns of compromise to vehicle structural integrity due to drilling, and greatly reduces installation times and vehicle degradation due to the installation of this equipment.

In accordance with still further aspects of the present invention, the electric or hydraulic extension arm is preferably electrically configured to operate from an electric control unit. The electric control unit can be a remote control unit, or a hard-wired pendant control unit.

The present invention apparatus and method is typically used to transfer disabled persons in and out of a vans, trucks, recreational vehicles, and other vehicles, but can also be used to transfer persons and/or things for other purposes. The present invention can be configured to incorporate the vertical pivot axis feature of the horizontal support member, or alternatively, can be configured with a fixed angle between the electric or hydraulic extension arm and the horizontal support member according to the particular application demands of the vehicle into which the lift is being installed.

This product has a broad range of applications including cars, vans, and trucks.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
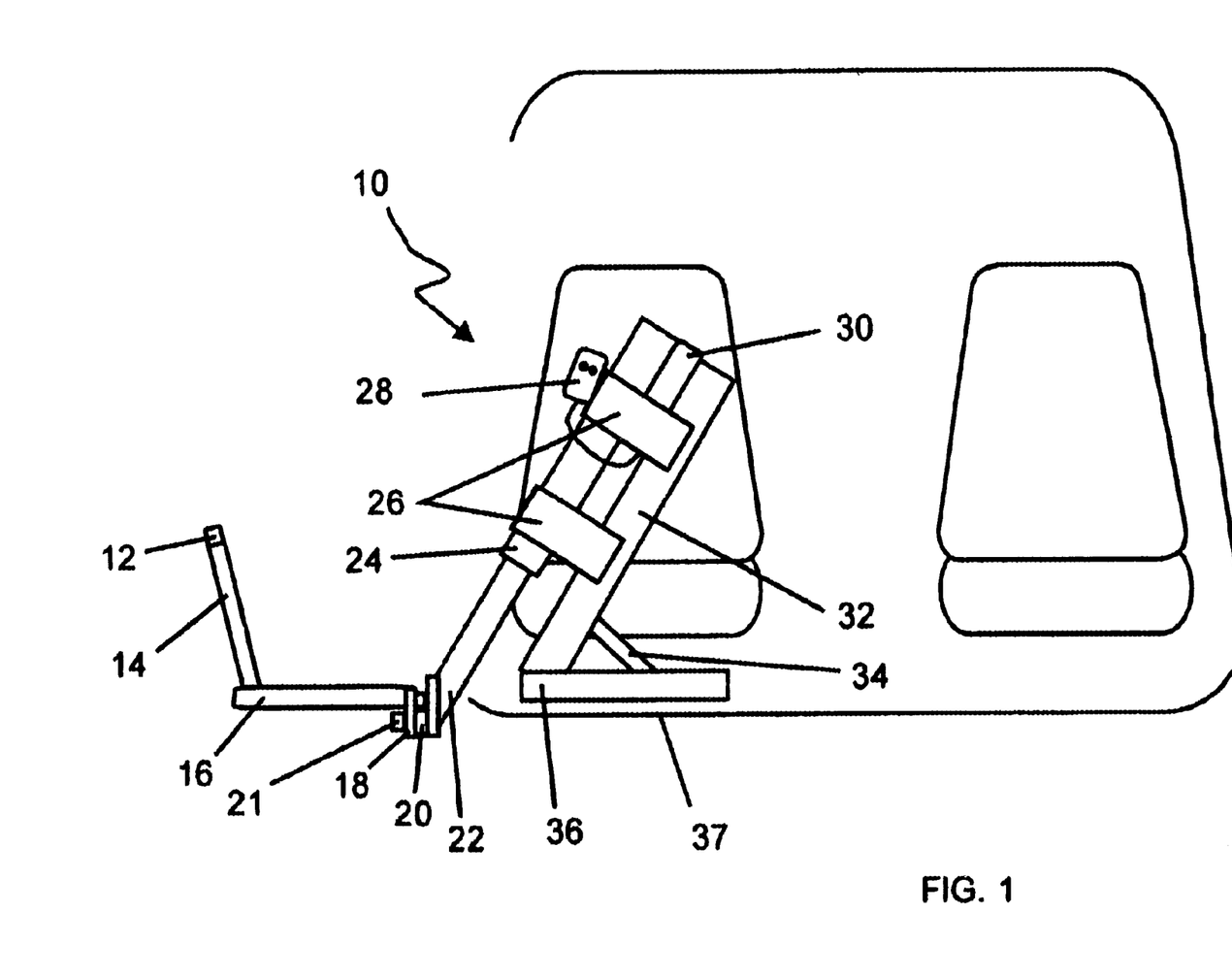
FIG. 1 is a rear view of a lifting and transferring apparatus in accordance with the present invention with seat in horizontal plane, safety arm deployed, and horizontal support member in the horizontal and fully "down" position.
Figure 2:
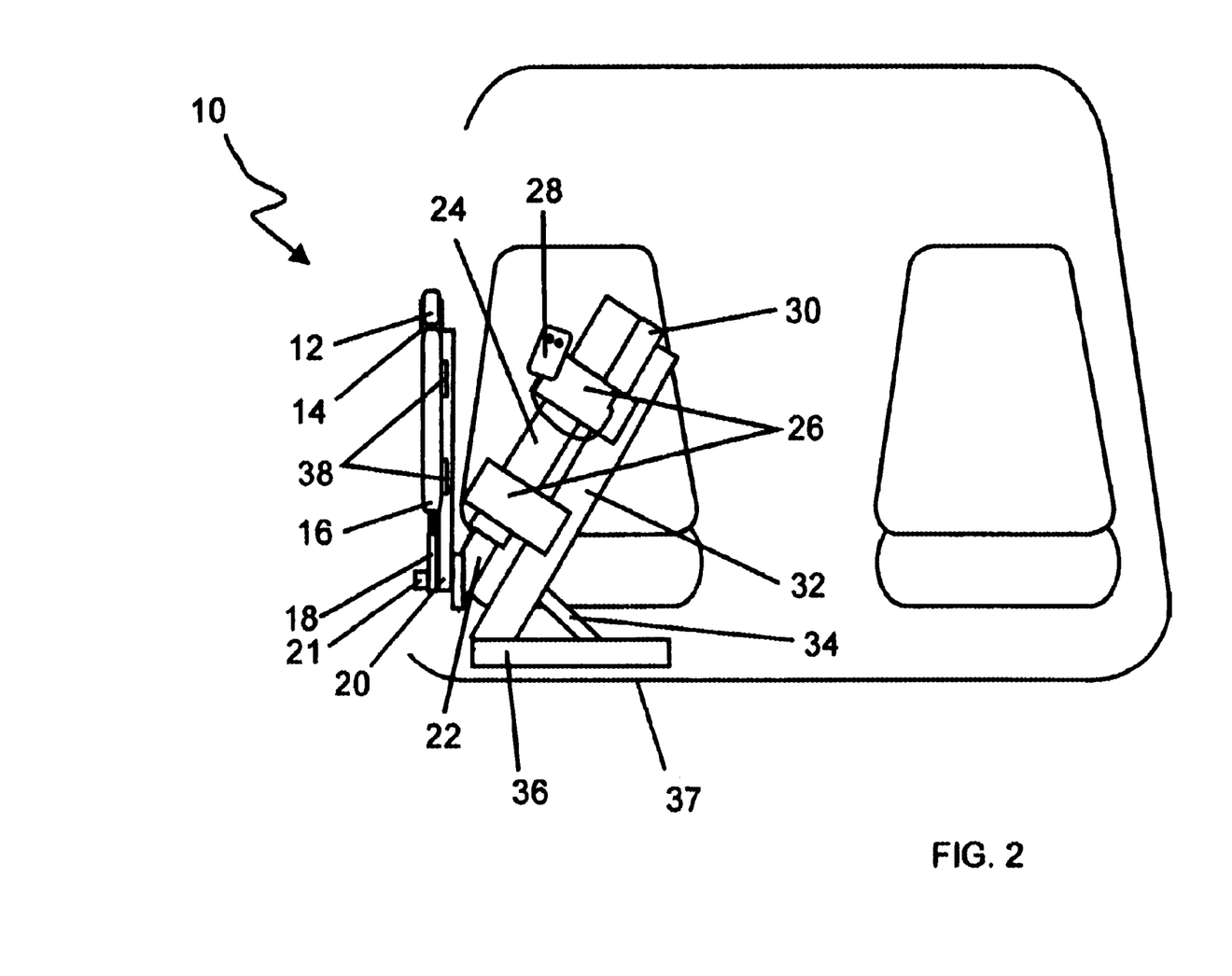
FIG. 2 is a rear view of a lifting and transferring apparatus shown in FIG. 1 with seat in vertical plane, safety arm stowed, and horizontal support member in the vertical and fully "up" position.

Referring to FIGS. 1–2, there is shown a lifting and transferring apparatus 10 in accordance with the present invention in two respective positions. Beginning from the bottom of the apparatus 10 upward, the apparatus 10 includes a horizontal l-support member 36 secured by three mounting tabs 44 for securely mounting the apparatus 10 to, for example, the floor 37 of a vehicle or other structure. It should be noted that an important feature of this l-support member 36 is that its structure is located adjacent to common vehicle seat-mounting stud locations, allowing for convenient placement of mounting tabs 44 such that vehicle seat-mounting studs would protrude through an aperture in mounting tabs 44, thus eliminating the need for drilling and other custom modifications to the vehicle and mounting structure. The apparatus 10 also includes a gusset 34 to stabilize the main vertical support 32 which, in turn, supports two mounting tabs 26 and 27 (obscured due to view) that serve to support the electrically-actuated extension arm 24. The electrically-actuated extension arm 24 may, depending on the constraints of the vehicle into which the lift is being installed, be attached to a side wall of the vehicle via mounting tabs 26 and 27 in certain applications rather than to be supported by a frame support structure as depicted in FIG. 2. The lengthening/shortening of the assembly of extension arm 24 with inner member 22 is controlled by a control unit 28 and a motor assembly 30, which can be a direct-drive electric motor and gear assembly or, alternatively, a hydraulic power pack. The inner member 22 is movable in a telescoping manner relative to the extension arm 24 with inner member 22 supported by extension arm 24. An important feature of the apparatus 10 is that the electric motor 30 comprises a manual crank to allow for emergency operation under conditions of power or equipment failure. For the hydraulic power pack version of motor assembly 30, a hydraulic release valve is incorporated for the same purpose.

At this point it should be noted that, although FIGS. 1–2 show the extension arm 24 positioned at a 30 degree angle with respect to a horizontal axis, other angles are also possible. Additionally, the fore/aft orientation of extension arm 24 may vary considerably from the depicted fore/aft inclination angle of 15 degrees, again depending on the specific requirements of a particular vehicle application.

Figure 8:
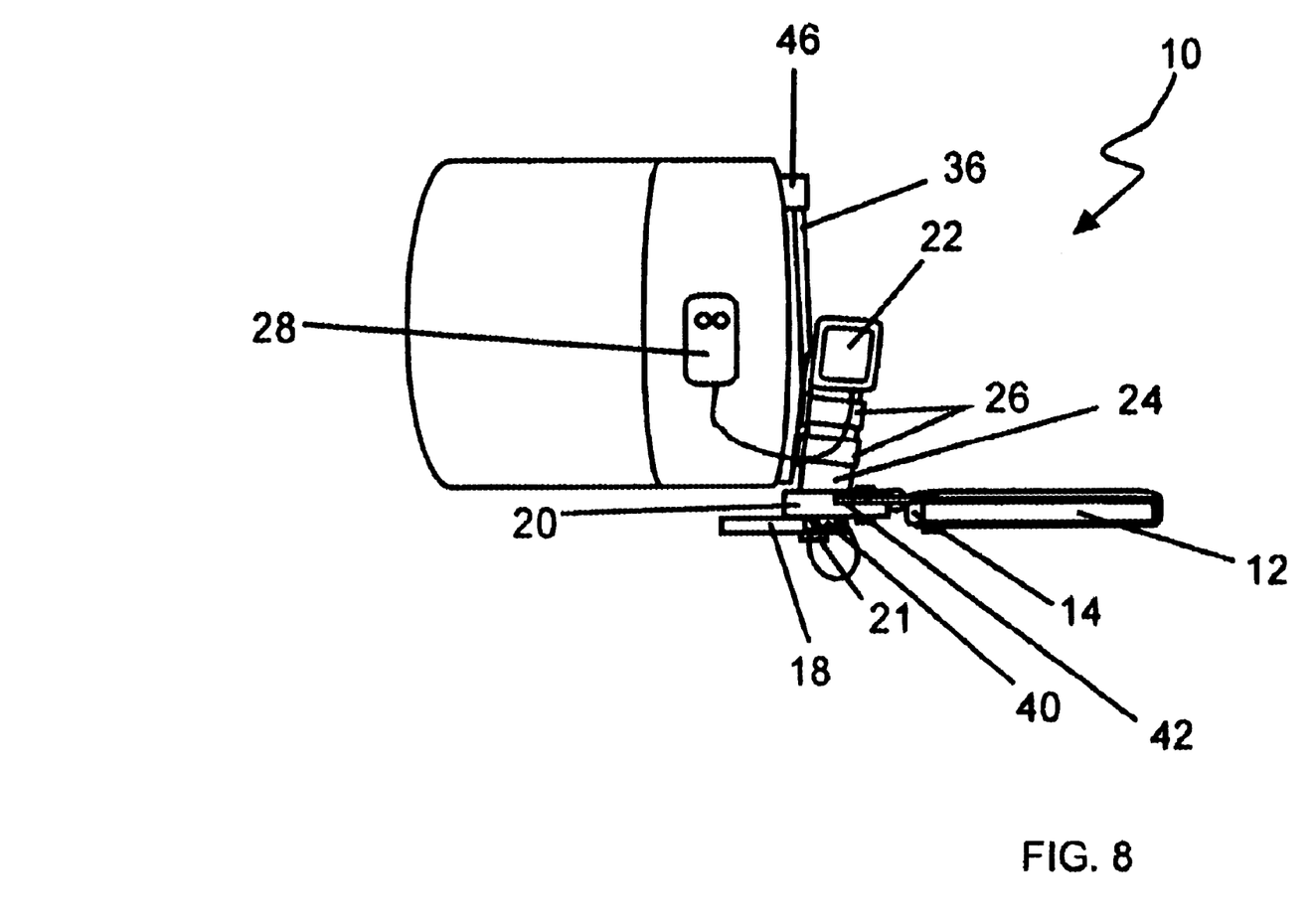
FIG. 8 is a top view of a lifting and transferring apparatus shown in FIG. 1 with seat in vertical plane and horizontal support member in the vertical and fully "up" position.

The lower end of inner member 22 has a support axle 21 for securely supporting a pivoting support member 20. Additionally, cam 18 allows pivoting support member 20 to rotate in excess of 90 degrees from a substantially horizontal orientation, as indicated in FIGS. 1, 3, 4, 6, and 7, through a substantially vertical orientation, as indicated in FIGS. 2, 5, and 8, by means of positional detents at each extremity of the desired motion.

It should further be noted that the pivoting action made possible by support axle 21, to allow pivoting support member 20 to pivot from a substantially horizontal orientation to a substantially vertical orientation, may not be desirable or possible, given the constraints of a particular vehicle application. In this case, pivoting support member 20 can be permanently affixed to inner member 22.

It should be further noted that, for vehicle applications where space constraints or desired interior layout make this a requirement, the lifting and transferring apparatus 10 may be constructed such that extension arm 24 and its support frame may be located in a position forward of the vehicle original seat, rather than rearward, as depicted in FIGS. 1–8. Such a lifting and transferring apparatus 10 would, in effect, be rendered as a mirror image of FIGS 3–8, mirrored along the horizontal axis.

It should be further noted that, for vehicle applications where space constraints or desired interior layout make this a requirement, the lifting and transferring apparatus 10 may be constructed such that seat 16 and pivoting support member 20 would be located to the right of the vehicle original seat, rather than to the left, as depicted in FIGS. 1–8. Such a lifting and transferring apparatus 10 would, in effect, be rendered as a mirror image of FIGS 1–2, mirrored along the horizontal axis.

Pivoting support member 20 is attached to seat 16 via two hinges 38 to allow seat 16 to pivot about a substantially horizontal axis when pivoting support member 20 is in a substantially horizontal orientation or about a substantially vertical axis when pivoting support member 20 is in a substantially vertical orientation.

Figure 3:
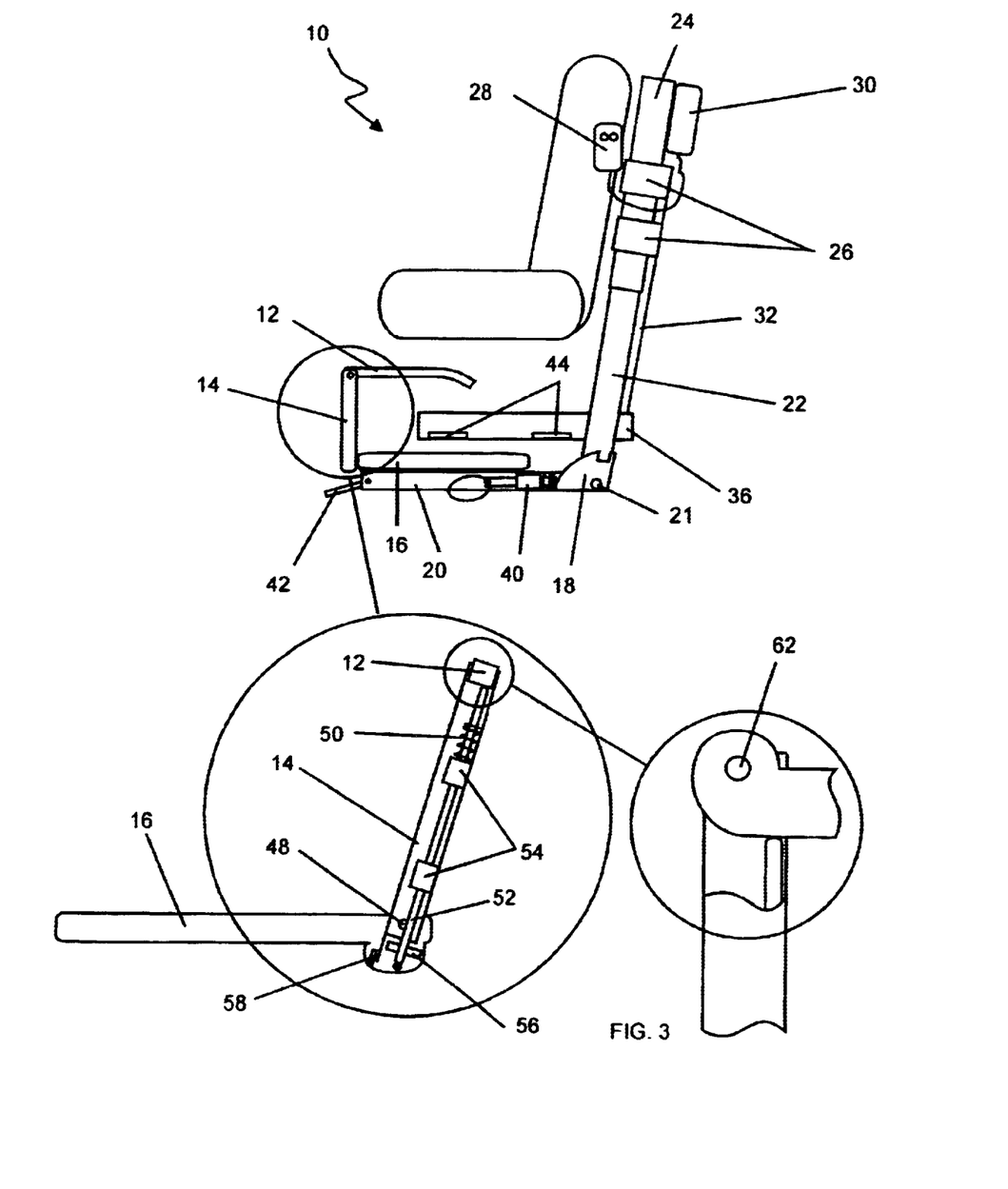
FIG. 3 is a side view of a lifting and transferring apparatus shown in FIG. 1 with seat in horizontal plane, and horizontal support member in the horizontal and fully "down" position. Additionally, a detail is provided of the front view of the safety arm mechanism.
Figure 4:
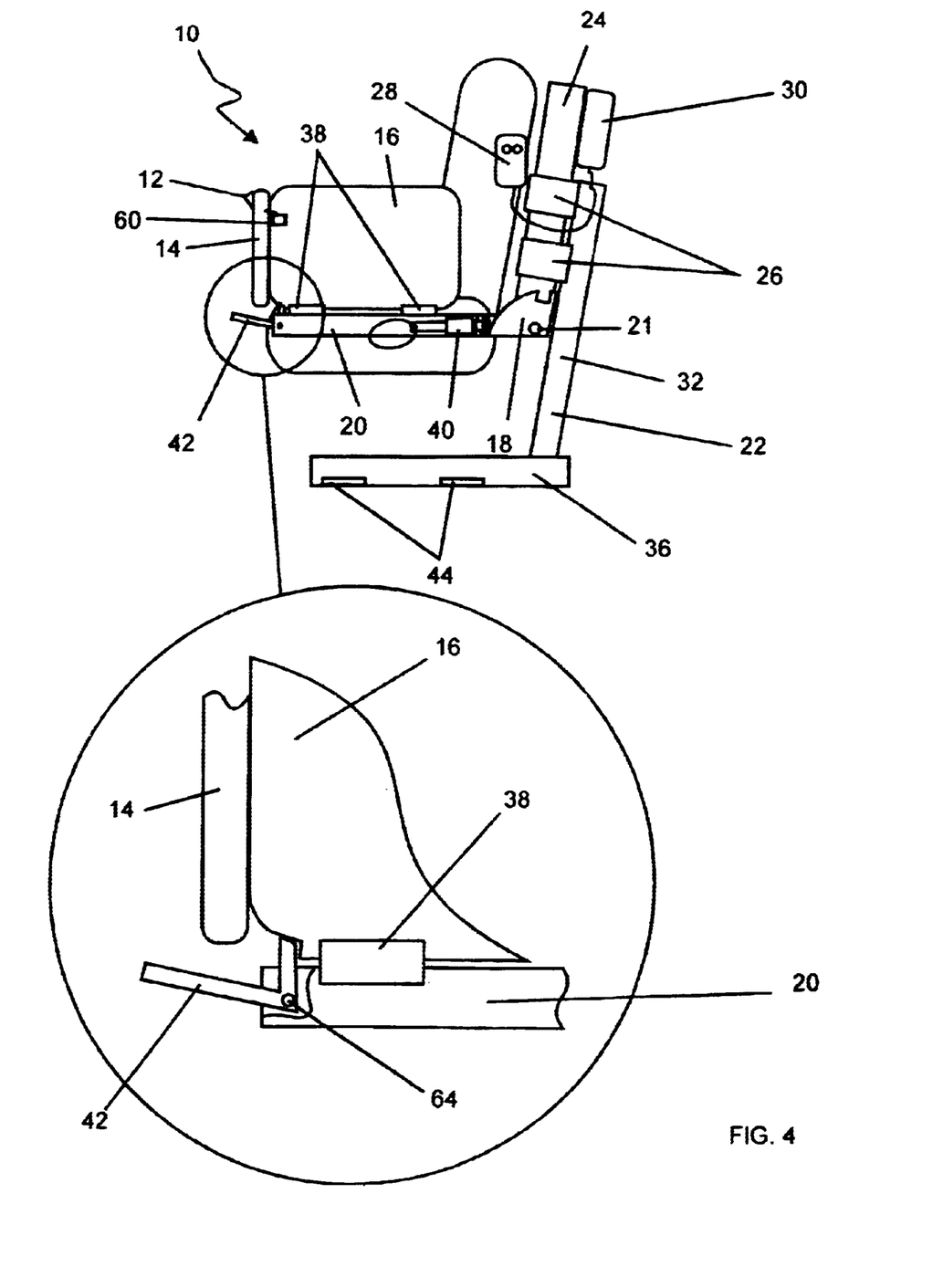
FIG. 4 is a side view of a lifting and transferring apparatus shown in FIG. 1 with seat in vertical plane, and horizontal support member in the horizontal and fully "up" position. Additionally, a detail is provided of the side view of the seat vertical latch mechanism.
Figure 5:
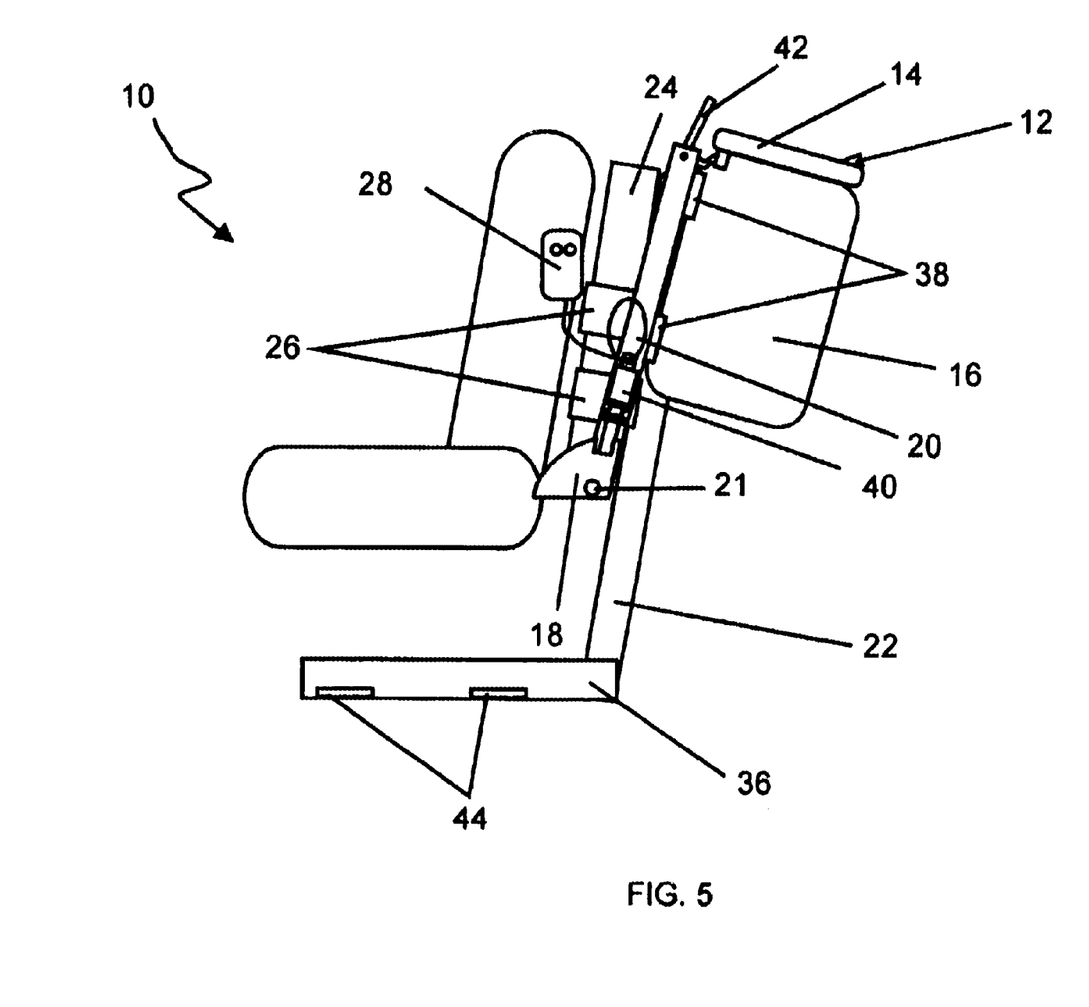
FIG. 5 is a side view of a lifting and transferring apparatus shown in FIG. 1 with seat in vertical plane, and horizontal support member in the vertical and fully "up" and locked position.
Figure 6:
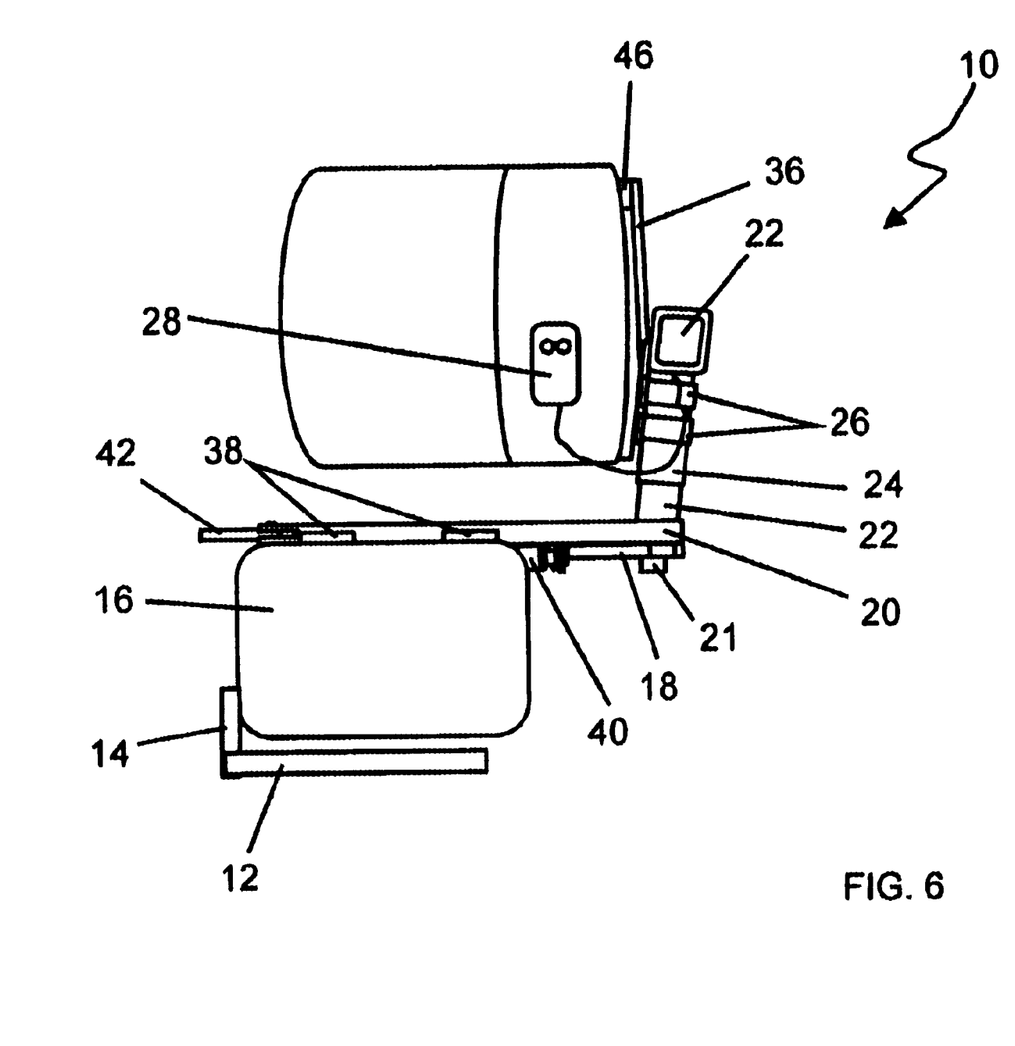
FIG. 6 is a top view of a lifting and transferring apparatus shown in FIG. 1 with seat in horizontal plane and horizontal support member in the horizontal and fully "down" position.
Figure 7:
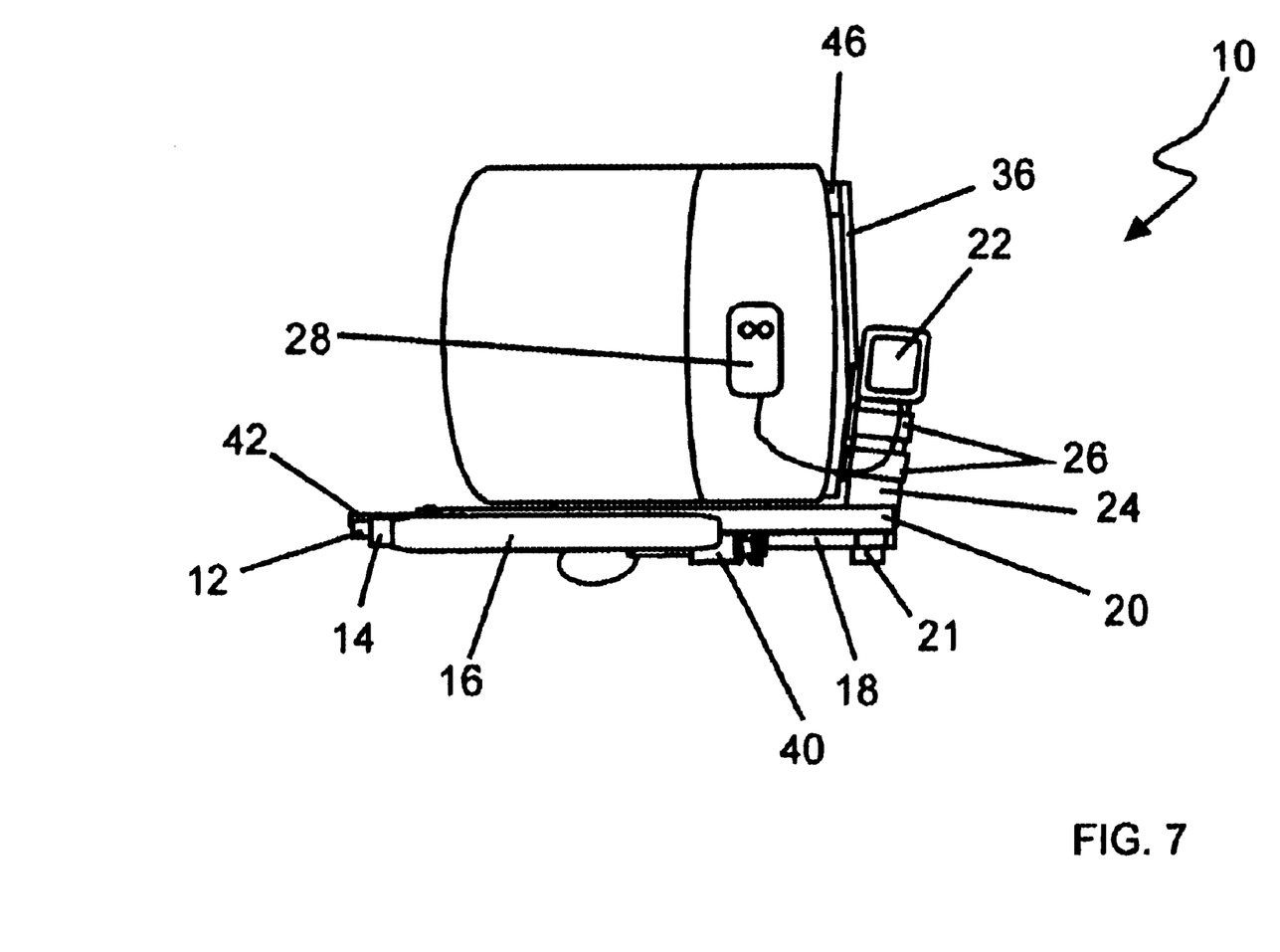
FIG. 7 is a top view of a lifting and transferring apparatus shown in FIG. 1 with seat in vertical plane and horizontal support member in the horizontal and fully "up" position.

Referring to FIGS. 3–5, there are shown side views of apparatus 10 in three respective stages of operation through the entry/exit sequence. Locking pin 40, working in conjunction with cam 18, allows pivoting support member 20 to rotate in excess of 90 degrees from a substantially horizontal orientation through a substantially vertical orientation as indicated above. It should be noted that locking pin 40 incorporates a tensioner spring whose purpose is to maintain pressure on the locking pin 40 along the upper surface of cam 18 in order to insure positive engagement with detents at both the horizontal and vertical positions of pivoting support member 20.

FIG. 3 incorporates a front side-view detail drawing of the safety arm upright support 14, safety handle 12 and locking pin 52. Upon deployment, safety arm upright support 14 is pivoted along the horizontal axis of safety arm horizontal support axle 48 until its structure contacts stop gusset 58. Subsequently, the user would rotate safety handle 12 along a substantially horizontal axis through safety handle support axle 62 from the substantially vertical position within safety arm upright support 14 through a 270-degree arc to a substantially horizontal resting position. This action, due to the cam-shaped end of safety handle 12, provokes a downward movement of safety handle locking pin 52, forced by spring 50 and guided by two safety handle locking pin guides 54, through an aperture in safety handle detent pad 56 thus immobilizing safety handle 12, and activating safety handle limit switch 60. The safety handle limit switch 60 is electrically tied to motor assembly 30 in such manner that the motor assembly 30 will not operate unless safety handle limit switch 60 is activated. The passive locking pin feature and safety handle limit switch 60 are important features of the present invention, due to the fact that any other design which relies on user intervention to assure a proper locking action is subject to user error, and potential harm to the user if the user fails to deploy the safety handle, or if the safety handle should release during the entry, exit, or transfer processes.

It should be additionally noted that, for vehicles in which the safety handle is not feasible due to space or layout constraints, it can be replaced by a seat belt attached to the seat and incorporating a limit switch which allows motor assembly 30 to be activated only when the belt is secured. This feature, although it can be defeated, provides a measure of security to ensure that the user does not fall from the seat while the lift is in motion.

FIG. 4 incorporates a detail drawing of the seat vertical stow lock mechanism 42, which rotates about axis 64. Once seat 16 has been rotated to a substantially vertical position along the axis of hinges 38, in preparation for movement of pivoting support member 20 towards its horizontal detent, it is useful for reasons of safety and convenience to secure the seat in a substantially vertical orientation while the pivoting support member 20 is being rotated, and while the vehicle is in motion. This feature is particularly important in vehicles where clearance between the left side of the seat back and the innermost surface of the b-pillar is tight, requiring precise alignment of seat 16 and safety arm and handle assembly 12 and 14 during the rotation process.

In summary, some of the unique aspects of the present invention are listed below. One unique aspect includes the location of the extension arm mechanism behind the seat rather than underneath the seat or underneath the vehicle which facilitates easy installation, and which allows for an outward motion when there are obstacles such as sill plates, seat belt hardware, rocker panels, trim panels, and running boards. This is very important for high vehicles such as four wheel drive vehicles. The location of the extension arm mechanism behind the seat also allows for compound angles of descent/ascent incorporating varying degrees of vertical and horizontal components to facilitate avoidance of components of the vehicle structure such as the forward edge of the B-pillar.

Another unique aspect includes the location of the extension arm mechanism within the passenger compartment so as to avoid structural modifications to the vehicle where the extension arm mechanism and/or the structure of the lift must pass through the vehicle structure. In contrast, most prior art devices require substantial chassis modification.

Another unique aspect includes the foldaway feature at the joint between the platform support bar and the vertical extension arm, which allows the platform and platform support bar to be rotated completely away from the from the driver's compartment, thus eliminating any possible concern about impact between user and equipment in case of an accident.

Another unique aspect includes avoiding expensive door panel modifications and elimination and/or modification of seat trim panels.

Another unique aspect includes the integrated safety arm and handle assembly interlock system, which takes a passive approach. That is, if the user deploys the safety handle at all and puts any kind of weight on it, it is positively locked in position. Additionally, if it is not properly deployed, the lift will not work at all. This is important in terms of liability end-user safety. Alternatively, if this can't be done, due to space or other constraints, a belt may be used, which must be secured in order for the lift to function. The primary advantage of this system is safety, in that it would be impossible for the user to fall from the seat while using the lift due to the interlocks.

Another unique aspect includes the cam-style design of the safety handle and all of the mechanisms of the safety handle, including the integration of the safety handle limit switch into the motion of the safety handle locking pin.

Another unique aspect includes the design of the pivoting support member locking cam 18.

Another unique aspect includes the uniqueness of the support mechanism which can be integrated with factory seat bolts, thus greatly reducing installation time and hassle.

Another unique aspect includes the seat vertical stow lock mechanism. Without this, it would be very difficult to rotate the horizontal support and seat assembly backwards, and the seat would be flapping around as you drove if it were not secured.

The present invention is not to be limited in scope by the specific embodiments described herein. Indeed, various modifications of the present invention, in addition to those described herein will be apparent to those of skill in the art from the foregoing description and accompanying drawings. Thus, such modifications are intended to fall within the scope of the appended claims.

What is claimed is:

1. A lifting apparatus for transferring a user to and from a seat of a vehicle, the apparatus comprising:
   a mounting and support assembly for attachment to a chassis of the vehicle;
   an extension arm assembly supported by the mounting and support assembly such that the extension arm is located substantially behind the vehicle seat;
   a pivoting support member attached to the extension arm assembly so as to allow the pivoting support member to pivot about a substantially horizontal axis between a substantially horizontal position and a substantially vertical position; and
   a pivoting transfer seat attached to the pivoting support member so as to allow the pivoting transfer seat to pivot about a substantially horizontal axis when the pivoting support member is in its substantially horizontal position and about a substantially vertical axis when the pivoting support member is in its substantially vertical position, such that the pivoting transfer seat pivots between a substantially horizontal seating position and a substantially vertical stowed position when the pivoting support member is in its substantially horizontal position;
   wherein the extension arm assembly is operative to raise and lower the pivoting support member and the pivoting transfer seat along a plane having a vertical component such that the substantially horizontal seating position of the pivoting transfer seat is substantially level with the vehicle seat when the pivoting support member and the pivoting transfer seat are raised by the extension arm.

2. The apparatus of claim 1, further comprising:
   a locking assembly associated with the pivoting support member for securing the pivoting support member in its substantially vertical position.

3. The apparatus of claim 1, further comprising:
   a locking assembly associated with the pivoting transfer seat for securing the pivoting transfer seat in its substantially vertical stowed position.

4. The apparatus of claim 1, further comprising:
   a pivoting safety arm attached to the pivoting transfer seat so as to allow the pivoting safety arm to pivot about a substantially horizontal axis between a substantially horizontal stowed position and a substantially vertical safety position when the pivoting transfer seat is in its substantially horizontal seating position.

5. The apparatus of claim 4, wherein the substantially horizontal axis of the pivoting safety arm is substantially orthogonal to the substantially horizontal axis of the pivoting support member.

6. The apparatus of claim 4, further comprising:
   a pivoting safety handle attached to the pivoting safety arm so as to allow the pivoting safety handle to pivot about a substantially horizontal axis between a substantially vertical stowed position and a substantially horizontal safety position when the pivoting safety arm is in its substantially vertical safety position.

7. The apparatus of claim 6, further comprising:
   a locking assembly associated with the pivoting safety handle for securing the pivoting safety handle in its substantially horizontal safety position.

8. The apparatus of claim 7, wherein the locking assembly includes an electrical switch for disabling the extension arm assembly if the pivoting safety handle is not properly secured in its substantially horizontal safety position.

9. The apparatus of claim 6, wherein the substantially horizontal axis of the pivoting safety handle is substantially parallel to the substantially horizontal axis of the pivoting support member.

10. The apparatus of claim 6, wherein the substantially horizontal axis of the pivoting safety handle is substantially orthogonal to the substantially horizontal axis of the pivoting safety arm.

11. The apparatus of claim 1, wherein the vehicle seat is attached to the vehicle chassis using seat-mounting studs, and wherein the mounting and support assembly is attached to the vehicle chassis using at least some of the same seating mounting studs.

12. The apparatus of claim 1, wherein the substantially horizontal axis and the substantially vertical axis of the pivoting transfer seat are both substantially orthogonal to the substantially horizontal axis of the pivoting support member.

13. A lifting apparatus for transferring a user to and from a seat of a vehicle, the apparatus comprising:
   a mounting and support assembly for attachment to a chassis of the vehicle;
   an extension arm assembly supported by the mounting and support assembly such that the extension arm is located substantially behind the vehicle seat;
   a pivoting support member attached to the extension arm assembly so as to allow the pivoting support member to pivot about a substantially horizontal axis between a substantially horizontal position and a substantially vertical position; and
   a pivoting transfer seat attached to the pivoting support member so as to allow the pivoting transfer seat to pivot about a substantially horizontal axis when the pivoting support member is in its substantially horizontal position and about a substantially vertical axis when the pivoting support member is in its substantially vertical position, such that the pivoting transfer seat pivots between a substantially horizontal seating position and a substantially vertical stowed position when the pivoting support member is in its substantially horizontal position;
   wherein the extension arm assembly is operative to raise and lower the pivoting support member and the pivoting transfer seat along a substantially diagonal plane with respect to the substantially vertical axis such that the substantially horizontal seating position of the pivoting transfer seat is substantially level with the vehicle seat when the pivoting support member and the pivoting transfer seat are raised by the extension arm.

14. A lifting apparatus for transferring a user to and from a seat of a vehicle, the apparatus comprising:
   a mounting and support assembly for attachment to a chassis of the vehicle;
   an extension arm assembly supported by the mounting and support assembly such that the extension arm is located substantially in front of the vehicle seat;
   a pivoting support member attached to the extension arm assembly so as to allow the pivoting support member to pivot about a substantially horizontal axis between a substantially horizontal position and a substantially vertical position; and
   a pivoting transfer seat attached to the pivoting support member so as to allow the pivoting transfer seat to pivot about a substantially horizontal axis when the pivoting support member is in its substantially horizontal position and about a substantially vertical axis when the pivoting support member is in its substantially vertical position, such that the pivoting transfer seat pivots between a substantially horizontal seating position and a substantially vertical stowed position when the pivoting support member is in its substantially horizontal position;

wherein the extension arm assembly is operative to raise and lower the pivoting support member and the pivoting transfer seat along a plane having a vertical component such that the substantially horizontal seating position of the pivoting transfer seat is substantially level with the vehicle seat when the pivoting support member and the pivoting transfer seat are raised by the extension arm.

* * * * *